(12) United States Patent
Ali et al.

(10) Patent No.: US 9,565,526 B2
(45) Date of Patent: Feb. 7, 2017

(54) SYSTEM AND METHOD FOR DYNAMIC GEO-FENCING

(71) Applicant: Dell Products L.P., Round Rock, TX (US)

(72) Inventors: Raziuddin Ali, Austin, TX (US); Jason A. Shepherd, Austin, TX (US); Philip M. Seibert, Austin, TX (US); Yuan-Chang Lo, Austin, TX (US); Douglas Miles Anson, Dripping Springs, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 13/776,104

(22) Filed: Feb. 25, 2013

(65) Prior Publication Data

US 2014/0242947 A1    Aug. 28, 2014

(51) Int. Cl.
*H04W 4/02*    (2009.01)

(52) U.S. Cl.
CPC .................... *H04W 4/022* (2013.01)

(58) Field of Classification Search
CPC ........ H04W 4/02; H04W 4/021; H04W 4/022; H04W 4/023; H04W 4/025; H04W 4/026; H04W 4/027; H04W 4/028
USPC .... 455/404.1, 404.2, 410, 411, 414.1, 414.2, 455/456.1, 456.2, 456.3, 456.4, 456.5, 456.6, 455/457
See application file for complete search history.

(56) References Cited

U.S. PATENT DOCUMENTS

| | | | |
|---|---|---|---|
| 5,812,865 A | 9/1998 | Theimer et al. | |
| 6,052,727 A | 4/2000 | Kamalanathan | |
| 7,587,411 B2 | 9/2009 | De Vorchik et al. | |
| 7,606,860 B2 | 10/2009 | Puthenkulam et al. | |
| 7,684,438 B2 | 3/2010 | Stephens et al. | |
| 8,250,150 B2 | 8/2012 | Beck et al. | |
| 8,254,902 B2 | 8/2012 | Bell et al. | |
| 2003/0050977 A1 | 3/2003 | Puthenkulam et al. | |
| 2003/0096633 A1 | 5/2003 | Goldberg | |
| 2007/0088801 A1 | 4/2007 | Levkovitz et al. | |
| 2007/0287418 A1 | 12/2007 | Reddy | |
| 2008/0304408 A1 | 12/2008 | Kraemer et al. | |
| 2009/0111467 A1 | 4/2009 | Chai et al. | |
| 2009/0264098 A1 | 10/2009 | Lo et al. | |
| 2010/0293598 A1 | 11/2010 | Collart et al. | |
| 2011/0223860 A1 | 9/2011 | Lo et al. | |
| 2012/0172027 A1* | 7/2012 | Partheesh | H04W 4/021 455/420 |

(Continued)

FOREIGN PATENT DOCUMENTS

WO    WO 2012000107 A1 *    1/2012    ............. G06F 21/88

OTHER PUBLICATIONS

U.S. Appl. No. 13/755,237, Ali.

(Continued)

*Primary Examiner* — Erica Navar
(74) *Attorney, Agent, or Firm* — Winstead PC

(57) ABSTRACT

In one embodiment, a method includes establishing a geo-fencing environment for the information handling system. The method further includes monitoring a stream of context information. In addition, the method includes determining whether the geo-fencing environment should be dynamically modified responsive to new context information in the stream. Furthermore, the method includes dynamically modifying the geo-fencing environment responsive to the determining so indicating.

14 Claims, 5 Drawing Sheets

(56) References Cited

U.S. PATENT DOCUMENTS

| | | | |
|---|---|---|---|
| 2012/0172054 A1 | 7/2012 | Waters et al. | |
| 2012/0188905 A1 | 7/2012 | Dandekar et al. | |
| 2012/0243437 A1 | 9/2012 | Horn et al. | |
| 2012/0244832 A1 | 9/2012 | Carlander | |
| 2012/0246294 A1 | 9/2012 | Eaton et al. | |
| 2012/0265913 A1 | 10/2012 | Suumaki et al. | |
| 2012/0284769 A1* | 11/2012 | Dixon et al. | 726/1 |
| 2012/0310527 A1* | 12/2012 | Yariv et al. | 701/426 |
| 2013/0144731 A1* | 6/2013 | Baldwin et al. | 705/17 |
| 2013/0150117 A1* | 6/2013 | Rodriguez | G06T 7/00 455/550.1 |
| 2013/0331127 A1* | 12/2013 | Sabatelli et al. | 455/456.3 |
| 2014/0171099 A1* | 6/2014 | Sydir | H04W 4/021 455/456.1 |

OTHER PUBLICATIONS

Bluenio, "nioPremium", Bluenio ltd, 2012, 3 pages.
Bluenio, "nioGuard", Bluenio ltd, 2012, 3 pages.
Bluenio, "nioSoft Tag", Bluenio ltd., 2012, 3 pages.
Bluenio, "nioTag", Bluenio ltd, 2012, 2 pages.
Bluenio, "Don't let losing something ruin your day", Bluenio ltd, 2012, 2 pages.
Bluenio, "96% of lost phones have their data accessed", Bluenio ltd, 2012, 3 pages.
Bluenio, "nio", Bluenio ltd, 2012, 3 pages.
Bluenio, "70 million smartphones are lost every year", Bluenio ltd, 2012, 2 pages.
SeekDroid AntiTheft and Security, GT Media, LLC, Feb. 2013, 2 pages.
SeekDroid, Track your phone. Secure your data. Anywhere., GT Media, LLC, 2011, 4 pages.
Squiggly, my app.factory, Feb. 2013, 2 pages.
Scarfone, Karen et al., "Guidelines on Firewalls and Firewall Policy", National Institute of Standards and Technology, NIST Special Publication 800-41, Revision 1, Sep. 2009, 48 pages.
Debes, M. et al., "Definition and Implementation of Context Information", Proceedings of the 2nd Workshop on Positioning, Navigation and Communication (WPCN'05) &1st Ultra-Wideband Expert Talk (UET'05), 2005, pp. 63-68.

* cited by examiner

SYSTEM AND METHOD FOR DYNAMIC GEO-FENCING

BACKGROUND

Technical Field

The present invention relates generally to information security and more particularly, but not by way of limitation, to systems and methods for dynamically maintaining a geo-fencing environment.

History Of Related Art

Traditional geo-fencing solutions specify an action to be taken when a monitored device enters or exits a geo-fenced area. For example, the geo-fenced area may be defined as a distance radius relative to a fixed point, and the specified action may be to sound an alarm. However, traditional geo-fencing solutions are generally inflexible. For example, such solutions do not generally enable a geo-fence to be modified once it is established.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes establishing a geo-fencing environment for an information handling system. The method further includes monitoring, by the information handling system, a stream of context information. In addition, the method includes determining, by the information handling system, whether the geo-fencing environment should be dynamically modified responsive to new context information in the stream. Furthermore, the method includes the information handling system dynamically modifying the geo-fencing environment responsive to the determining so indicating.

In one embodiment, an information handling system includes a processing unit operable to perform a method. The method includes establishing a geo-fencing environment for the information handling system. The method further includes monitoring a stream of context information. In addition, the method includes determining whether the geo-fencing environment should be dynamically modified responsive to new context information in the stream. Furthermore, the method includes dynamically modifying the geo-fencing environment responsive to the determining so indicating.

In one embodiment, a computer-program product includes a computer-usable medium having computer-readable program code embodied therein. The computer-readable program code is adapted to be executed to implement a method. The method includes establishing a geo-fencing environment for an information handling system. The method further includes monitoring a stream of context information. In addition, the method includes determining whether the geo-fencing environment should be dynamically modified responsive to new context information in the stream. Furthermore, the method includes dynamically modifying the geo-fencing environment responsive to the determining so indicating.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, geo-fences can be made dynamic and more flexible via principles described herein. In a typical embodiment, an information handling system such as, for example, a smart phone, has a geo-fencing application loaded and executing thereon that dynamically maintains a geo-fencing environment for the information handling system. The geo-fencing application can establish and dynamically maintain the geo-fencing environment based on, for example, dynamic context information.

A geo-fence, as used herein, refers to a virtual perimeter for a real-world geographic area. The real-world geographic area within a given geo-fence will be referenced herein as a geo-fenced area. A geo-fencing application, as used herein, is a software application that is operable to facilitate establishment and/or modification of a geo-fence for a given information handling system. Dynamic context information, as used herein, refers to variable characteristics of an information handling system and/or of the information handling system's environment. Such variable characteristics may be referenced herein as contextual variables. Dynamic context information that provides values for contextual variables may be referenced herein as contextual values.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
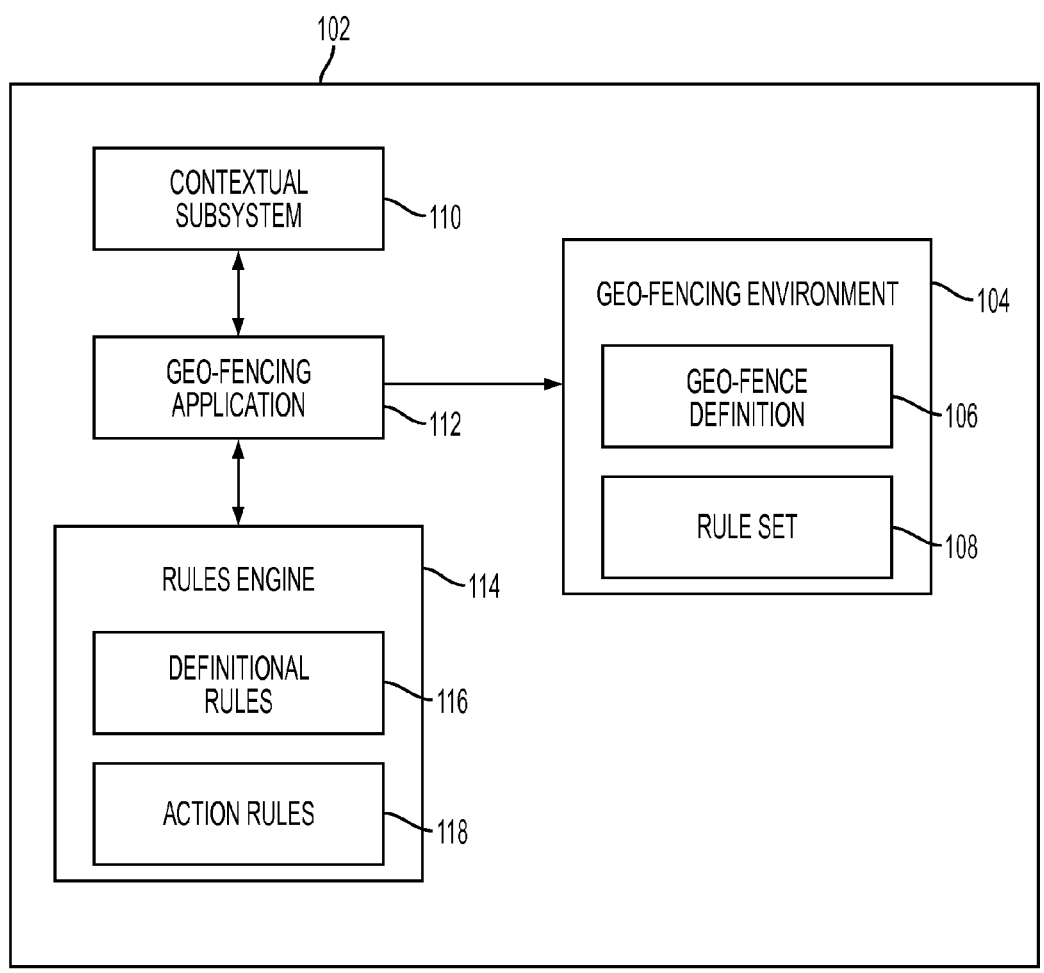
FIG. 1 illustrates an information handling system that is operable to perform dynamic geo-fencing.

FIG. 1 illustrates an information handling system 102 that is operable to perform dynamic geo-fencing. The information handling system 102 includes a contextual subsystem 110, a geo-fencing application 112, and a rules engine 114. The geo-fencing application 112 interacts with the contextual subsystem 110 and the rules engine 114 to dynamically maintain a geo-fencing environment 104 for the information handling system 102.

Although the contextual subsystem 110 and the rules engine 114 are depicted as two separate software components, in various other embodiments, such software components are organized differently. For example, the contextual subsystem 110 and the rules engine 114 could be merged with the geo-fencing application 112, be combined into a single software component separate from the geo-fencing application 112, each be further divided into other software components, or have their collective functionality allocated differently among any number of software components.

The contextual subsystem 110 is operable to provide a stream of dynamic context information to the geo-fencing application 112, which information the geo-fencing application 112 can leverage to dynamically maintain the geo-fencing environment 104. In various embodiments, functionality of the contextual subsystem 110 is exposed to the geo-fencing application 112 via, for example, an application programming interface (API). In various other embodiments, the contextual subsystem 110 may be considered an abstraction of a plurality of contextual sources that are accessible to the geo-fencing application 112. The contextual subsystem 110 may be provided, for example, by a third-party software vendor, a given device vendor, or by an aggregation of multiple software and/or device vendors.

The contextual subsystem 110 typically leverages hardware and software resources of the information handling system 102 to produce the dynamic context information. For example, the contextual subsystem 110 can utilize global positioning system (GPS) capabilities, operating-system-provided resources, and the like. Therefore, it should be appreciated that the contextual subsystem 110 is typically operable to provide numerous categories of context information. For example, as described in greater detail below, the dynamic context information can include any combination of location information, proximity information, scheduling information, user information, security-capability information, service-type information, and content-classification information. Numerous other categories of context information are also contemplated and will be apparent to one of skill in the art after reviewing the inventive principles outlined herein.

The location information typically includes information indicative of a physical location of the information handling system 102. For example, in various embodiments, the location information identifies a geographic location (e.g., geographic coordinates). In various embodiments, the location information can further identify whether the information handling system 102 is located indoors or outdoors. The proximity information includes information identifying a geographic proximity of the information handling system 102 to a target such as, for example, another information handling system (e.g., another information handling system associated with the same user), an object, or a geographic location. The scheduling information can include, for example, a current date and time.

The user information classifies a user of the information handling system 102 and can include, for example, information identifying the user and a group and/or domain to which the user belongs. The security-capability information typically includes information identifying a security tier of the user. For example, the security-capability information can indicate whether the user has local, corporate, or cloud-level authentication. The service-type information usually classifies information being exchanged, for example, as a file transfer, a screen share, a discovery broadcast, a discovery response, or the like. Finally, the content-classification information indicates a degree to which content such as, for example, a document or media file, is deemed confidential or sensitive. For example, the content-classification information can result from an analysis of the content and can include a score, a category classification, or the like.

The rules engine 114 establishes polices that govern maintenance of the geo-fencing environment 104 based on contextual variables. The policies of the rules engine 114 can be established by users, corporate administrators, or other parties. In a typical embodiment, each policy is a rule that includes a Boolean expression and at least one result that is dependent upon whether the Boolean expression evaluates to true or false. For example, the Boolean expression for each rule can specify absolute values and/or ranges of values for each of one or more contextual variables. The values and/or ranges of values can be connected by Boolean operators such as, for example, AND, OR, and NOT. As shown, the rules engine 114 includes definitional rules 116 and action rules 118.

In a typical embodiment, the definitional rules 116 establish policies for resolving an appropriate geo-fence. For example, the definitional rules 116 can be used to determine whether any geo-fence is applicable and, if so, how the geo-fence is defined (e.g., a distance radius or a formula for calculating the distance radius based on contextual variables). In particular, the at least one result of each of the definitional rules 116 defines the boundaries of an applicable geo-fence. In various embodiments, the definitional rules 116 can include a separate rule for each distinct geo-fence definition. In various other embodiments, the definitional rules 116 can additionally include, for example, conditional logic (e.g., If/Else logic), that logically connects multiple Boolean expressions in a determined fashion. In these embodiments, each branch of the conditional logic could relate to a distinct geo-fence definition. For example, a single rule could be applicable to multiple or all geo-fence definitions.

In a typical embodiment, the action rules 118 establish policies governing operation of the information handling system 102 within a geo-fenced area. In one aspect, the action rules 118 can be used to define actions to be taken by the information handling system 102 if the Boolean expression evaluates to true or false, as applicable. For example, the Boolean expression of a given rule of the action rules 118 can relate to whether the information handling system 102 has exited the geo-fenced area. The at least one result of the given rule could be at least one action such as, for example, sounding an alarm, wiping all or a configurable portion of memory of the information handling system 102, notifying a vendor or service provider for the information handling system 102, or the like.

In another aspect, the action rules 118 can be used to restrict actions that can be taken by a user of the information handling system 102 while the information handling system 102 is within a geo-fenced area. For example, the action rules 118 could include rules that determine an allowability of particular types of information exchanges. Examples of how information exchanges can be controlled based on dynamic context information are described in U.S. patent application Ser. No. 13/755,237, which application is hereby incorporated by reference.

It should be appreciated that the definitional rules 116 and the action rules 118 are merely illustrative of types rules that can be maintained by the rules engine 114. In various embodiments, the rules engine 114 maintains other rules in addition to the definitional rules 116 and the action rules 118. In addition, it should not be inferred that the rules engine 114 must store and maintain the definitional rules 116 and the action rules 118 differently than or separately from other rules or each other. Rather, the definitional rules 116 and the action rules 118 are illustrative of logically related types of rules that the rules engine 114 can maintain. While some embodiments may utilize separate storage and/or maintenance of the definitional rules 116 and the action rules 118, in other embodiments, the definitional rules 116 and the action rules 118 are stored and maintained together with other rules.

The geo-fencing environment 104 includes a geo-fence definition 106 and a rule set 108. The geo-fence definition 106 typically includes information sufficient to outline the boundaries of an applicable geo-fenced area at a given point in time. For example, the geo-fence definition 106 may include a distance radius relative to a fixed point such as, for example, a geographic location (e.g., a public location such as a restaurant). In a typical embodiment, the geo-fence definition 106 is created via a definitional rule from the definitional rules 116. The rule set 108 includes rules that are applicable to the geo-fence definition 106 at the given point in time. For example, the rule set 108 can include rules that define actions that take place relative to the geo-fence definition 106. The rule set 108 typically includes rules that are selected from the action rules 118. It should be appreciated the rule set 108 is not necessarily maintained separate and apart from, for example, the action rules 118. Rather, in a typical embodiment, the rule set 108 is representative of those rules of the action rules 118 that could evaluate to true given the geo-fence definition 106.

In various embodiments, the geo-fencing application 112 is operable to maintain selected rules from each of the definitional rules 116 and the action rules 118 as profiles. In that way, each profile is generally a specified configuration of the definitional rules 116 and the action rules 118. As will be described in more detail with respect to FIG. 3, each profile can specify, for example, one or more definitional rules of the definitional rules 116 and one or more action rules of the action rules 118 that are to be utilized at a specified point in time. For example, profiles may exist that correspond to each of a public location, a user's home, a physical site for an enterprise, the existence of specific other information handling systems in close proximity thereto, or the like. In this fashion, depending on a physical location of the information handling system 102, a proximity of the information handling system 102 to another information handling system, or other contextual values, different profiles (and different rules) may be applicable. In various embodiments, profiles can also be user created and/or user initiated. For example, a user may create a custom profile that corresponds to a public location (e.g., a restaurant). The user could initiate that profile or any other profile upon entry to the public location.

In operation, the geo-fencing application 112 dynamically maintains the geo-fencing environment 104 based on interactions with the contextual subsystem 110 and the rules engine 114. The geo-fencing application 112 monitors a stream of dynamic context information received from the contextual subsystem 110. The stream of dynamic context information supplies contextual values that can be used for evaluating the definitional rules 116 and the action rules 118. Since the geo-fencing environment 104 is dynamically maintained, the geo-fence definition 106 and the rule set 108 can change, for example, responsive to new dynamic context information. Examples will be described with respect to FIGS. 4-5.

Figure 2A:
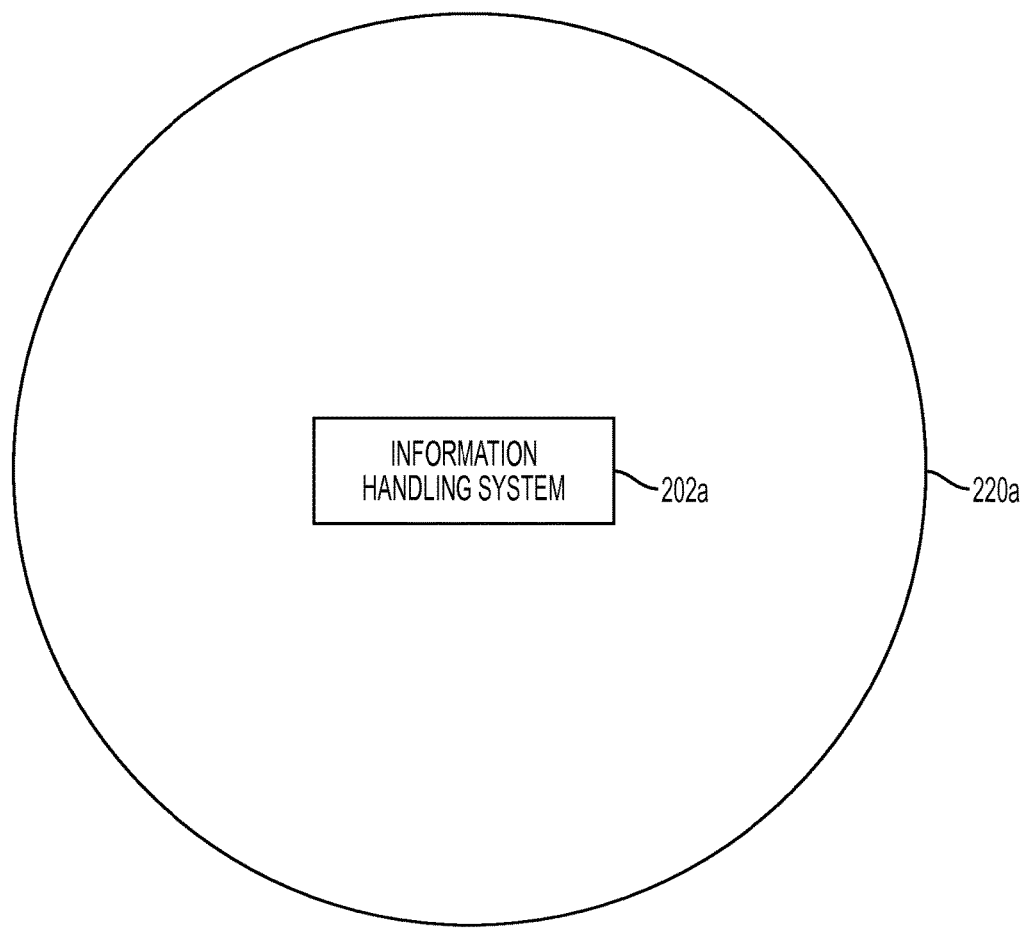
FIG. 2A illustrates an exemplary geo-fence.

FIG. 2A illustrates an exemplary geo-fence 220a for an information handling system 202a. In a typical embodiment, the geo-fence 220a is defined via a geo-fence definition such as, for example, the geo-fence definition 106 of FIG. 1. As shown, the geo-fence 220a is circular in shape and can be defined, for example, as a distance radius relative to a fixed point.

Figure 2B:
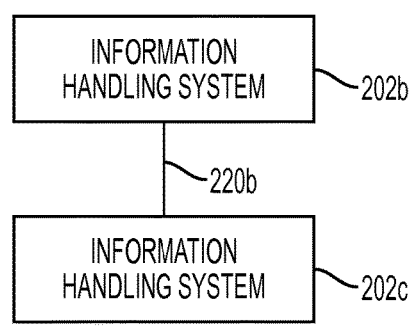
FIG. 2B illustrates an exemplary geo-fence.

FIG. 2B illustrates an exemplary geo-fence 220b. The geo-fence 220b is an electronic leash that is intended to restrict a first information handling system 202b to a specified linear distance from a second information handling system 202c. Therefore, the geo-fence 220b is used to ensure a specified proximity of the first information handling system 202b to the second information handling system 202c (i.e., a leash). In various embodiments, the geo-fence 220b can be a two-way electronic leash. In these embodiments, the first information handling system 202b and the second information handling system 202c each have a geo-fencing application loaded and executing thereon and are effectively leashed to each other. The first information handling system 202b and the second information handling system 202c can be, for example, portable information handling systems associated with a same user (e.g., a smart phone, a laptop computer, a tablet computer, etc.). Multi-way leashes are also contemplated, for example, for when a user may have three or more information handling systems that should be leashed to each other.

Figure 3:
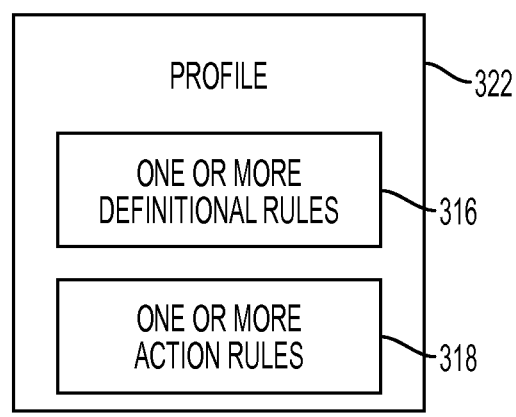
FIG. 3 illustrates an example of a profile that can be maintained by a geo-fencing application.

FIG. 3 illustrates an example of a profile 322 that can be maintained by a geo-fencing application such as, for example, the geo-fencing application 112 of FIG. 1. The profile 322 includes one or more definitional rules 316 and one or more action rules 318. In various embodiments, the profile 322 has a trigger condition that causes the geo-fencing application to make the profile 322 active (i.e., put into service). The trigger condition can be, for example, a Boolean expression that specifies an existence of one or more contextual values (e.g., physical location, proximity, etc.). In various embodiments, the trigger condition can be represented as a rule that is stored and maintained by a rules engine such as, for example, the rules engine 114 of FIG. 1. In various other embodiments, the trigger condition may be user initiation of the profile 322 via a user interface provided by the geo-fencing application.

The one or more definitional rules 316 are typically selected from a master set of definitional rules such as, for example, the definitional rules 116 of FIG. 1. The one or more definitional rules 316 govern how a geo-fence is established when the profile 322 is active. Similarly, the one or more action rules 118 are typically selected from a master set of action rules such as, for example, the action rules 118 of FIG. 1. The one or more action rules 318 govern operation of the information handling system 102 when the profile 322 is active.

Figure 4:
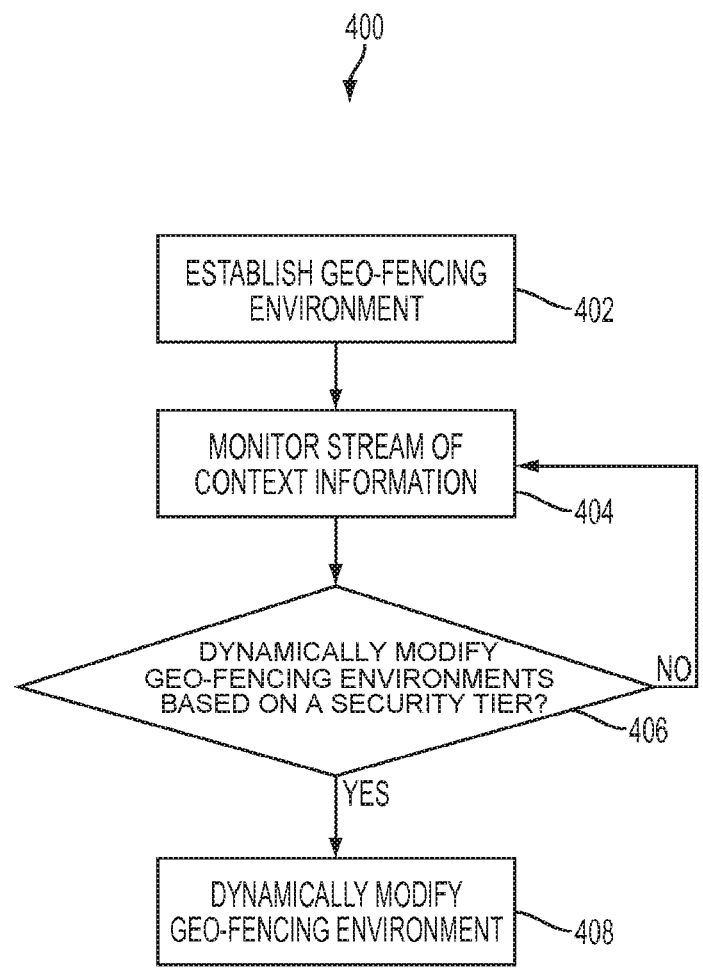
FIG. 4 illustrates a process for maintaining a geo-fencing environment.

FIG. 4 illustrates a process 400 for maintaining a geo-fencing environment such as, for example, the geo-fencing environment 104 of FIG. 1. In a typical embodiment, the process 400 is executed by a geo-fencing application loaded and executing on an information handling system. The geo-fencing application and the information handling system typically operate as described, for example, with respect to the geo-fencing application 112 and the information handling system 102, respectively, of FIG. 1. The process 400 begins at step 402.

At step 402, the geo-fencing application establishes the geo-fencing environment. Establishing the geo-fencing environment typically involves creating a geo-fence definition and identifying an associated rule set. In a typical embodiment, the geo-fence definition is created based on a set of definitional rules such as, for example, the definitional rules 116 of FIG. 1. In a typical embodiment, the associated rule set is identified from a set of action rules such as, for example, the action rules 118 of FIG. 1. In various embodiments, the geo-fencing application may utilize an applicable profile such as, for example, the profile 322 of FIG. 3, to establish the geo-fencing environment. From step 402, the process 400 proceeds to step 404.

At step 404, the geo-fencing application monitors a stream of dynamic context information received from a contextual subsystem such as, for example, the contextual subsystem 110 of FIG. 1. The stream of dynamic context information supplies contextual values that can be used for evaluating the definitional rules and the action rules. Additionally, the geo-fencing application typically applies the associated rule set for the geo-fencing environment using the stream of dynamic context information. As the geo-fencing application receives new dynamic context information, the process 400 proceeds to step 406.

At step 406, the geo-fencing application determines whether the geo-fencing environment should be modified responsive to the new dynamic context information. In various embodiments, the determination encompasses evaluating rules of the definitional rules 116 and of the action rules 118 via contextual values provided by the dynamic context information. For example, the new dynamic context information may indicate that the information handling system is now outdoors, has entered or left a defined proximity distance to another information handling system, or the like. If it is determined at step 406 that the geo-fencing environment should be modified, the process 400 proceeds to step 408. If it is determined at step 406 that the geo-fencing environment should not be modified, the process 400 returns to step 404 and proceeds as described above.

At step 408, the geo-fencing application dynamically modifies the geo-fencing environment. In various embodiments, the dynamic modification includes creating a geo-fence definition and identifying an associated rule set in a manner similar to that which is described with respect to step 402. As a result of step 408, the geo-fencing environment typically includes a different geo-fence definition and/or a different associated rule set. From step 408, the process 400 returns to step 404 and operates as described above. In a typical embodiment, the process 400 continues to execute until the geo-fencing application's geo-fencing functionality is deactivated, for example, by an authenticated user.

Figure 5:
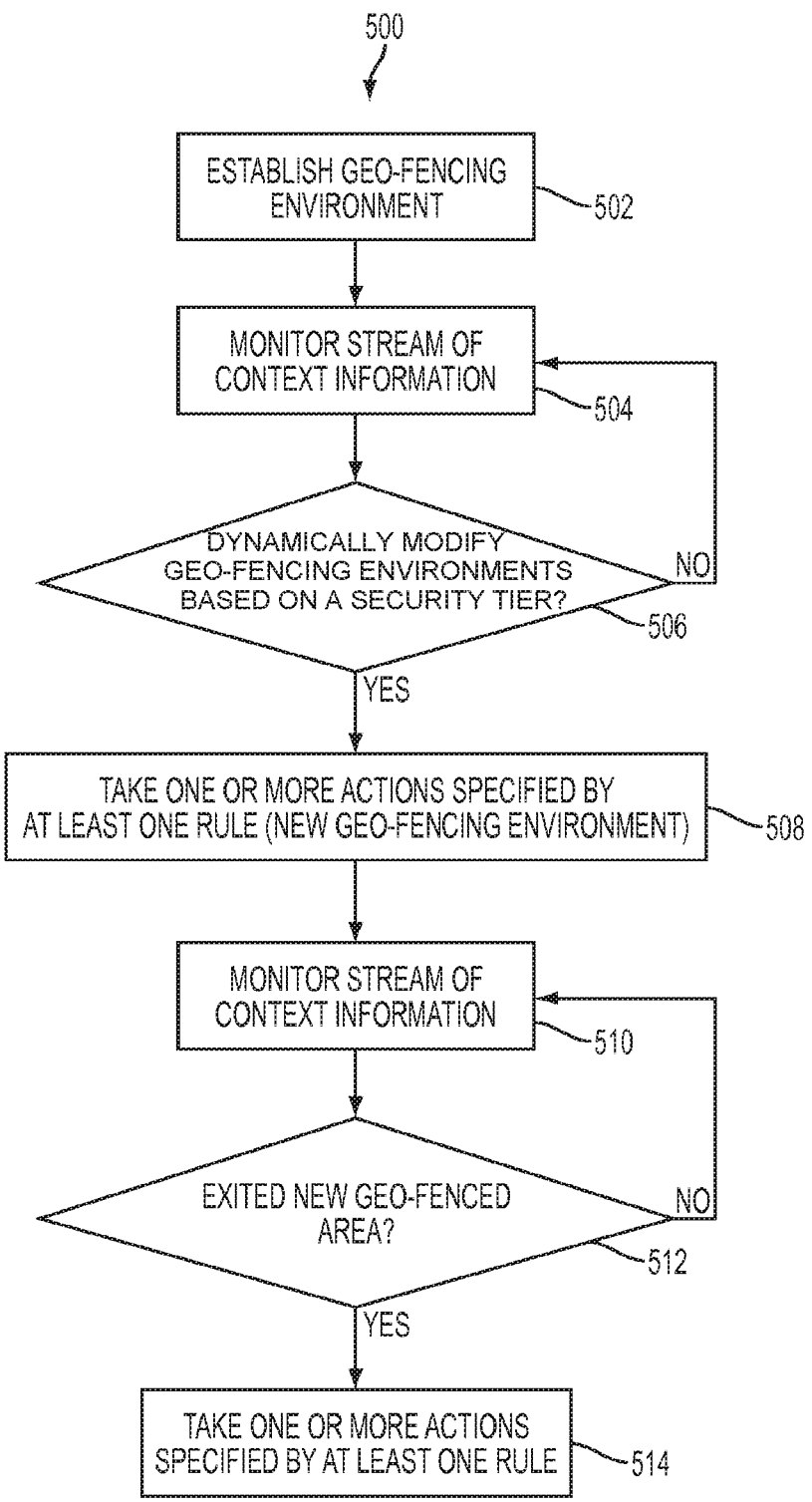
FIG. 5 illustrates a process for maintaining a geo-fencing environment.

FIG. 5 illustrates a process 500 for dynamically maintaining a geo-fencing environment such as, for example, the geo-fencing environment 104 of FIG. 1. For illustrative purposes, the process 500 specifically relates to a process for dynamically modifying the geo-fence environment when it is determined that the information handling system has exited a geo-fenced area. In a typical embodiment, the process 500 is executed by a geo-fencing application loaded and executing on the information handling system. The geo-fencing application and the information handling system typically operate as described, for example, with respect to the geo-fencing application 112 and the information handling system 102, respectively, of FIG. 1. The process 500 begins at step 502.

At step 502, the geo-fencing application establishes the geo-fencing environment. Establishing the geo-fencing environment typically involves creating a geo-fence definition and identifying an associated rule set as described with respect to step 402 of FIG. 4. The geo-fence definition can be, for example, an electronic leash relative to another information handling system. For purposes of this example, the associated rule set is assumed to include at least one rule that is triggered when the information handling system exits the geo-fenced area. As described in greater detail below, the at least one rule specifies one or more actions that should be taken responsive to the at least one rule being triggered. From step 502, the process 500 proceeds to step 504.

At step 504, the geo-fencing application monitors a stream of dynamic context information received from a contextual subsystem such as, for example, the contextual subsystem 110 of FIG. 1. The stream of dynamic context information supplies contextual values that can be used for evaluating the definitional rules and the action rules. Additionally, the geo-fencing application typically applies the associated rule set for the geo-fencing environment using the stream of dynamic context information. As the geo-fencing application receives new dynamic context information, the process 500 proceeds to step 506.

At step 506, the geo-fencing application determines whether the information handling system has exited the geo-fenced area. In various embodiments, the determination encompasses evaluating the at least one rule via one or more contextual values provided by the dynamic context information. In a typical embodiment, exiting the geo-fenced area raises an inference that the information handling system has been stolen. If it is determined at step 506 that the information handling system has exited the geo-fenced area, the process 500 proceeds to step 508. If it is determined at step 506 that the information handling system has not exited the geo-fenced area, the process 500 returns to step 504.

At step 508, the geo-fencing application takes the one or more actions specified by the at least one rule. For example, the one or more actions may include sounding an alarm, dynamically creating a new geo-fence definition, and identifying a new rule set based on the new geo-fence definition. In a typical embodiment, the new geo-fence definition corresponds to an area in which the alarm can likely be heard so that the information handling system can be recovered. The new rule set typically includes at least one rule that specifies one or more actions to be taken if the information handling system exits the new geo-fenced area. Therefore, step 508 results in a new geo-fence environment that includes the new geo-fence definition and the new associated rule set. From step 508, the process 500 proceeds to step 510.

At step 510, the geo-fencing application again monitors the stream of dynamic context information as described with respect to step 504. As the geo-fencing application receives new dynamic context information, the process 500 proceeds to step 512. At step 512, the geo-fencing application determines whether the information handling system has exited the new geo-fenced area. The determination typically involves evaluating the at least one rule of the new rule set via contextual values provided by the dynamic context information. In a typical embodiment, exiting the new geo-fenced area raises an inference that the information handling system is not likely to be quickly recovered. If it is determined at step 512 that the information handling system has exited the new geo-fenced area, the process 500 proceeds to step 514. If it is determined at step 512 that the information handling system has not exited the new geo-fenced area, the process 500 returns to step 510.

At step 514, the geo-fencing application takes the one or more actions specified by the at least one rule of the new rule set. For example, the one or more actions may include wiping all or a configurable portion of the information handling system's memory, locking the information handling system from access, and/or reporting a possible theft of the information handling system (e.g., to a service provider, an enterprise, or a user associated with the information handling system). After step 514, the process 500 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    establishing a geo-fencing environment for an information handling system, wherein the information handling system comprises a mobile device;
    monitoring, by the information handling system, a stream of context information;
    determining, by the information handling system, whether the geo-fencing environment should be dynamically modified responsive to new context information in the stream, wherein the new context information comprises security-capability information identifying a security tier of a user of the information handling system;
    the information handling system dynamically modifying the geo-fencing environment responsive to the determining so indicating;
    wherein the establishing comprises utilizing a profile, the profile comprising one or more definitional rules and one or more action rules;
    wherein the dynamically modifying comprises:
        creating a new geo-fence definition and identifying an associated rule set for the new geo-fence definition, wherein each new geo-fence definition comprises a rule set that is distinct from the rule set prior to the modifying the geo-fencing environment; and
        taking the one or more actions, wherein the taking the one or more actions comprises:
            locking the information handling system from access; and
            reporting a possible theft of the information handling system to a service provider.

2. The method of claim 1, wherein the determining comprises:
    evaluating at least one definitional rule of a plurality of definitional rules via the new context information; and
    evaluating at least one action rule of a plurality of action rules via the new context information.

3. The method of claim 1, wherein the geo-fencing environment comprises a geo-fence definition and an associated rule set.

4. The method of claim 3, wherein the geo-fence definition comprises at least one of a distance radius relative to a fixed point and an electronic leash.

5. The method of claim 1, comprising:
    wherein the determining comprises evaluating at least one rule via the dynamic context information, the at least one rule being triggered if the information handling system has exited a geo-fenced area defined by the geo-fence definition; and
    wherein the at least one rule comprises one or more actions to be taken if the at least one rule is triggered.

6. The method of claim 1, comprising:
    wherein the taking comprises:
        sounding an alarm;
        creating a new geo-fence definition;
        identifying a new rule set based on the new geo-fence definition; and
        wherein the new rule set comprises at least one rule that is triggered if the information handling system has exited a new geo-fenced area defined by the new geo-fence definition, the at least one rule comprising one or more actions;
    monitoring the stream of context information;
    evaluating the at least one rule of the new rule set responsive to the monitoring; and
    taking the one or more actions of the at least one rule of the new rule set if the evaluating step indicates that the information handling system has exited the new geo-fenced area.

7. The method of claim 1, wherein the new context information comprises at least one selected from the group consisting of: location information, proximity information, scheduling information, user information, service-type information, and content-classification information.

8. An information handling system comprising:
    a processing unit, wherein the processing unit is operable to perform a method comprising:
        establishing a geo-fencing environment for the information handling system, wherein the information handling system comprises a mobile device;
        monitoring a stream of context information for the information handling system;
        determining whether the geo-fencing environment should be dynamically modified responsive to new context information in the stream, wherein the new context information comprises security-capability information identifying a security tier of a user of the information handling system;
        dynamically modifying the geo-fencing environment responsive to the determining so indicating; and
        wherein the establishing comprises utilizing a profile, the profile comprising one or more definitional rules and one or more action rules;
        wherein the dynamically modifying comprises:
            creating a new geo-fence definition and identifying an associated rule set for the new geo-fence definition, wherein each new geo-fence definition comprises a rule set that is distinct from the rule set prior to the modifying the geo-fencing environment; and taking the one or more actions, wherein the taking the one or more actions comprises:
  locking the information handling system from access; and
  reporting a possible theft of the information handling system to a service provider.

9. The information handling system of claim 8, comprising:
  wherein the determining comprises:
    evaluating at least one definitional rule of a plurality of definitional rules via the new context information; and
    evaluating at least one action rule of a plurality of action rules via the new context information.

10. The information handling system of claim 8, wherein the geo-fencing environment comprises a geo-fence definition and an associated rule set.

11. The information handling system of claim 10, wherein the geo-fence definition comprises at least one of a distance radius relative to a fixed point and an electronic leash.

12. The information handling system of claim 8, comprising:
  wherein the determining comprises evaluating at least one rule via the dynamic context information, the at least one rule being triggered if the information handling system has exited a geo-fenced area defined by the geo-fence definition; and
  wherein the at least one rule comprises one or more actions to be taken if the at least one rule is triggered;
  wherein the dynamically modifying comprises taking the one or more actions;
  wherein the taking comprises:
    sounding an alarm;
    creating a new geo-fence definition;
    identifying a new rule set based on the new geo-fence definition; and
    wherein the new rule set comprises at least one rule that is triggered if the information handling system has exited a new geo-fenced area defined by the new geo-fence definition, the at least one rule comprising one or more actions;
    monitoring the stream of context information;
    evaluating the at least one rule of the new rule set responsive to the monitoring; and
    taking the one or more actions of the at least one rule of the new rule set if the evaluating step indicates that the information handling system has exited the new geo-fenced area.

13. The information handling system of claim 8, wherein the new context information comprises at least one selected from the group consisting of: location information, proximity information, scheduling information, user information, service-type information, and content-classification information.

14. A non-transitory computer-program product comprising a computer-usable medium having computer-readable program code embodied therein, the computer-readable program code adapted to be executed to implement a method comprising:
  establishing a geo-fencing environment for an information handling system, wherein the information handling system comprises a mobile device;
  monitoring a stream of context information;
  determining, by the information handling system, whether the geo-fencing environment should be dynamically modified responsive to new context information in the stream, wherein the new context information comprises security-capability information identifying a security tier of a user of the information handling system;
  the information handling system dynamically modifying the geo-fencing environment responsive to the determining so indicating;
  wherein the establishing comprises utilizing a profile, the profile comprising one or more definitional rules and one or more action rules;
  wherein the dynamically modifying comprises:
    creating a new geo-fence definition and identifying an associated rule set for the new geo-fence definition, wherein each new geo-fence definition comprises a rule set that is distinct from the rule set prior to the modifying the geo-fencing environment; and
    taking the one or more actions, wherein the taking the one or more actions comprises:
      locking the information handling system from access; and
      reporting a possible theft of the information handling system to a service provider.

* * * * *